Dec. 19, 1950   J. C. MOORE   2,534,790
FISHHOOK RELEASER
Filed Feb. 3, 1948
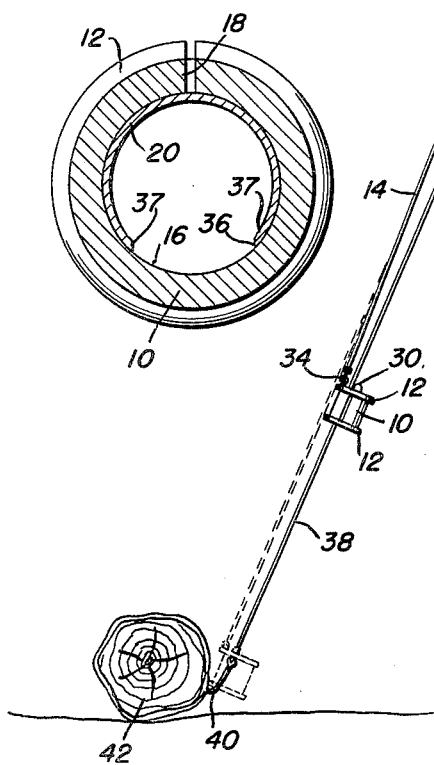
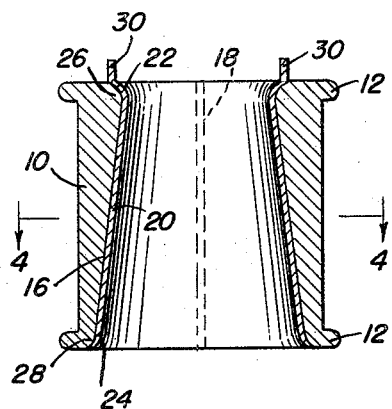
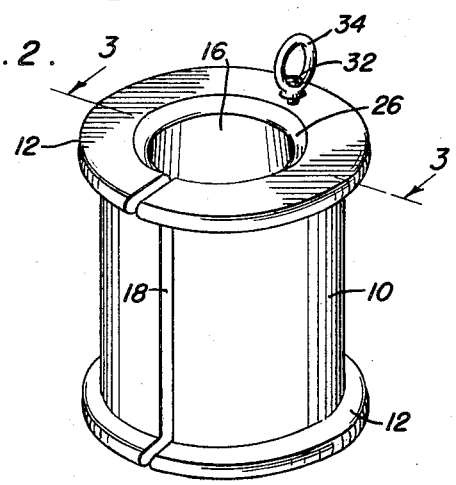
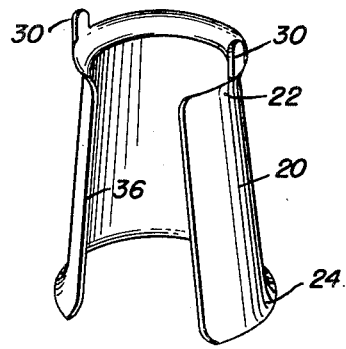
John C. Moore
INVENTOR.

Patented Dec. 19, 1950

2,534,790

UNITED STATES PATENT OFFICE 2,534,790

FISHHOOK RELEASER

John C. Moore, Bolivar, N. Y.

Application February 3, 1948, Serial No. 5,970

3 Claims. (Cl. 43—17.2)

1

This invention relates to new and useful improvements in fishing equipment and the primary object of the present invention is to provide a device for retrieving fishing hooks, lures and the like that have become snagged on foreign objects below the surface of the water.

Another important object of the present invention is to provide a fish hook and lure releasing device including a weighted body having a line engaging bore and a longitudinal slot communicating with the bore, and embodying novel and improved means for closing the slot to retain a fishing line loosely positioned in the bore.

A further object of the present invention is to provide a fish hook and lure retriever so deigned as to facilitate a lowering cord carried thereby to be conveniently wound about the same in a compact manner.

A still further aim of the present invention is to provide a fish hook and lure releasing device that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a diagrammatic view showing the present invention in use;

Figure 2 is a perspective view of the fish hook and lure retriever constructed in accordance with the present invention and showing the locking insert removed therefrom;

Figure 3 is a longitudinal vertical sectional view taken substantially on the plane of section line 3—3 of Figure 2, and showing the locking insert (in section) applied thereto;

Figure 4 is a transverse horizontal sectional view taken substantially on the plane of section line 4—4 of Figure 3; and, Figure 5 is a perspective view of the locking insert used in conjunction with the present invention.

Referring now to the drawings in detail, wherein for the purpose of illustration, there is disclosed a preferred embodiment of the present invention, the numeral 10 represents a substantially cylindrical body or weight the ends of which are formed with spaced annular retaining ribs 12 whereby the body 10 simulates a spool or drum on which a line 14 may be conveniently wound between the retaining ribs 12.

This body 10 is formed with a tapered substantially frusto-conical bore 16 that communicates with a longitudinal entrance slot 18 provided in the body 10.

Frictionally positioned in the bore 16 is a resilient locking insert which comprises a split substantially frusto-conical sleeve 20, the upper and lower outwardly flared or arcuate ends 22 and 24 of which frictionally engage the rounded upper end 26 and rounded lower end 28 of the body 10. Projecting outwardly from the upper minor end 22 of the locking insert 20, is a pair of spaced lugs or finger grips 30 that are integrally formed with the locking insert 20 and which project outwardly from the upper end of the body 10.

Fixed to the upper end of the body 10, is a headed pin 32 that rotatably supports an eye member 34 which engaes one end of the line 14 when the device is in use. This eye member 34 and pin 32 function as a swivel to prevent twisting or tangling of the line as the body 10 is lowered thereby.

In practical use of the present invention, the lugs 30 are gripped and are rotated so that the opening 36 of the locking insert between the rounded or feathered edges 37 of the insert 20, opposes and registers with the slot 18 formed in the body 10, thus permitting a fishing line 38 to be inserted loosely in the bore 16. The locking insert 20 is then rotated slightly by the lugs 30 to close the slot 18 so that the body 10 and insert 20, may be lowered by the line 14 along the fishing line 38 until the body 10 engages a hook 40 carried by the fishing line 38 that is snagged on a foreign object 42. The body 10 is then raised slightly and released which will effect a loosening of the snagged hook 40.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fish hook releaser comprising a body having an upwardly and inwardly tapered central bore and a longitudinal slot communicating with the bore for receiving a fishing line, an arcuate resilient locking plate extending throughout the length of said body and yieldingly mounted in the central bore, means for rotating the locking plate to close the slot throughout its length, means for retaining a line wound about the body, and means carried by the body for engaging a raising and lowering line, said second-named means including upper and lower flanges at the ends of said body, said slot extending through said flanges.

2. A fish hook releaser comprising a substantially cylindrical body having a frusto-conical bore therein and a longitudinal slot communicating with the bore, spaced ribs rigidly carried by the outer periphery of the body for retaining a line wound around on the body, a split hollow frusto-conical insert of resilient material yieldingly bearing against the wall of the bore, a pair of gripping lugs carried by and projecting longitudinally from the minor end of the insert for rotating the same to close the slot, and a swivel member carried by the body for securing a raising and lowering line.

3. A fish hook releaser comprising a cylindrical body having end flanges and a frusto-conical bore, the end edges of said body defining said bore being outwardly rounded, said body having a longitudinal slot extending throughout its length, a longitudinally split, hollow, frusto-conical resilient insert mounted in said bore for rotation and yieldingly bearing against the inner walls of said bore, said insert having outwardly flared end portions bearing against the outwardly rounded end edges of said body to prevent longitudinal movement of said insert relative to said body, and finger grips projecting from diametrically opposite sides of said insert, said finger grips being disposed at the minor end of said insert and permitting contraction of the insert for removal of the insert from the body.

JOHN C. MOORE.

REFERENCES CITED

The following references are of record in the file of this patent:

UNITED STATES PATENTS

| Number | Name | Date |
|---|---|---|
| 822,224 | Ryden | May 29, 1906 |
| 1,215,073 | Stevens | Feb. 6, 1917 |
| 1,418,259 | Heftler | May 30, 1922 |
| 1,475,704 | Kaufmann | Nov. 27, 1923 |
| 1,958,514 | Hope | May 15, 1934 |
| 2,001,241 | De Vries | May 14, 1935 |
| 2,097,536 | Shirk | Nov. 2, 1937 |
| 2,175,135 | Sorenson | Oct. 3, 1939 |
| 2,315,048 | Croft | Mar. 30, 1943 |
| 2,385,415 | Jackson | Sept. 25, 1945 |

FOREIGN PATENTS

| Number | Country | Date |
|---|---|---|
| 17,494 | Great Britain | 1891 |
| 610,687 | France | June 14, 1926 |